United States Patent
Tabirian et al.

(10) Patent No.: US 9,557,456 B2
(45) Date of Patent: Jan. 31, 2017

(54) BROADBAND OPTICS FOR MANIPULATING LIGHT BEAMS AND IMAGES

(71) Applicants: U.S. Government as represented by the Secretary of the Army, Washington, DC (US); Beam Engineering for Advanced Measurements Co., Orlando, FL (US)

(72) Inventors: Nelson V. Tabirian, Winter Park, FL (US); Sarik R. Nersisyan, Maitland, FL (US); Brian R. Kimball, Shrewsbury, MA (US); Diane M. Steeves, Franklin, MA (US)

(73) Assignees: The United States of America as Represented by the Secretary of the Army, Washington, DC (US); Beam Engineering for Advanced Measurements Co., Orlando, FL (US)

( * ) Notice: Subject to any disclaimer, the term of this patent is extended or adjusted under 35 U.S.C. 154(b) by 0 days.

(21) Appl. No.: 14/162,809

(22) Filed: Jan. 24, 2014

(65) Prior Publication Data
US 2015/0276997 A1    Oct. 1, 2015

Related U.S. Application Data

(63) Continuation-in-part of application No. 13/916,627, filed on Jun. 13, 2013, now abandoned, which is a continuation of application No. 12/697,083, filed on Jan. 29, 2010, now abandoned.

(51) Int. Cl.
*G02B 5/18* (2006.01)
*G02B 26/08* (2006.01)
*G02B 27/42* (2006.01)

(52) U.S. Cl.
CPC ......... *G02B 5/1828* (2013.01); *G02B 26/0808* (2013.01); *G02B 27/4261* (2013.01); *G02B 27/4272* (2013.01)

(58) Field of Classification Search
CPC ..... G02B 1/08; G02B 5/18; G02B 2005/1804; G02B 5/1814; G02B 5/1828; G02B 5/1833; G02B 5/1866; G02B 5/1871; G02B 5/30; G02B 5/3016; G02B 5/3025; G02B 5/3083; G02B 5/32; G02B 26/08; G02B 26/0808; G02B 27/106; G02B 27/1086; G02B 27/28; G02B 27/283; G02B 27/286; G02B 27/42; G02B 27/4272; G02F 1/133528; G02F 1/133531; G02F 1/133538
(Continued)

(56) References Cited

U.S. PATENT DOCUMENTS 3,721,486 A    3/1973    Bramley
6,792,028 B2    9/2004    Cook
(Continued)

OTHER PUBLICATIONS

Nersisyan, et al., Optical Axis Gratings in Liquid Crystals and Their Use for Polarization Insensitive Optical Switching, Journal of Nonlinear Optical Physics & Materials, Mar. 2009, pp. 1-47, vol. 18, No. 1.
(Continued)

*Primary Examiner* — Arnel C Lavarias
(74) *Attorney, Agent, or Firm* — Brian S. Steinberger; Law Offices of Brian S. Steinberger, P.A.

(57) ABSTRACT

Pointing and positioning system of light beams and images including a plurality of cycloidal diffractive waveplates, each waveplate capable of deviating a generally broadband light beam over a predetermined angle. The lateral translation and deviation angles of the light beams are controlled by
(Continued)

controlling the relative distance, rotational position, and the diffractive efficiency of a least one in the plurality of waveplates.

7 Claims, 10 Drawing Sheets

(58) Field of Classification Search
USPC ..... 359/573, 558, 566, 569, 485.05, 487.03, 359/489.01, 489.06, 489.09, 489.08, 359/489.15, 490.01, 490.02, 490.03, 359/483.01; 349/1, 18, 193, 194, 201, 349/202; 362/19; 353/20
See application file for complete search history.

(56) References Cited

U.S. PATENT DOCUMENTS

| | | | |
|---|---|---|---|
| 7,319,566 | B2 | 1/2008 | Prince |
| 7,324,286 | B1 | 1/2008 | Glebov |
| 8,643,822 | B2 | 2/2014 | Tan |
| 2004/0165126 | A1 | 8/2004 | Ooi |
| 2008/0278675 | A1 | 11/2008 | Escuti |
| 2009/0073331 | A1 | 3/2009 | Shi |
| 2011/0075073 | A1 | 3/2011 | Oiwa |
| 2012/0188467 | A1* | 7/2012 | Escuti ............... G02B 27/286 349/1 |

OTHER PUBLICATIONS

Nersisyan, et al., Polarization Insensitive Imaging Through Polarization Gratings, Optics Express, Feb. 2009, pp. 1817-1830, vol. 17, No. 3.

Sarkissian, et al., Polarization-Controlled Switching Between Diffraction Orders in Transverse-Periodically Aligned Nematic Liquid Crystals, Optics Letters, Aug. 2006, pp. 2248-2250, vol. 31, No. 15.

Dierking, Polymer Network-Stabilized Liquid Crystals, Advanced Materials, 2000, pp. 167-181, vol. 12, No. 3.

Sarkissian, et al., Periodically Aligned Liquid Crystal: Potential Application for Projection Displays, Mol. Cryst. Liq. Cryst., 2006, pp. 1-19, vol. 451.

Oise, Optics in the Southeast, Technical Conference and Tabletop Exhibit, Nov. 12-13, 2003, Orlando, FL, Optical Society of America.

Zel'Dovich, et al., Devices for Displaying Visual Information Disclosure, Jul. 2000, 10 pages.

Blinov, et al., Electrooptic Effects in Liquid Crystal Materials, Springer-Verlag New York, 1994, 17 pages.

Crawford, et al., Liquid Crystals in Complex Geometries; Formed by Polymer and Porous Networks, Taylor and Francis, 1996, pp. 4-5, 4 pages.

Sarkissian, et al., Potential Application of Periodically Aligned Liquid Crystal Cell for Projection Displays, Optical Society of America, 2005, pp. 1-3.

* cited by examiner

BROADBAND OPTICS FOR MANIPULATING LIGHT BEAMS AND IMAGES

CROSS REFERENCE TO RELATED APPLICATIONS

This application is a Continuation In Part of U.S. patent application Ser. No. 13/916,627 filed Jun. 13, 2013, which is a Continuation of U.S. patent application Ser. No. 12/697,083 filed Jan. 29, 2010.

STATEMENT REGARDING FEDERALLY SPONSORED RESEARCH OR DEVELOPMENT

This invention was made with Government support under Contract No. W911QY-07-C-0032.

RIGHTS OF THE GOVERNMENT

The invention described herein may be manufactured and used by or for the Government of the United States for all governmental purposes without the payment of any royalty.

CLAIM OF PRIORITY

This invention claims priority to the publication S. R. Nersisyan, N. V. Tabiryan, D. M. Steeves, B. R. Kimball, "Optical Axis Gratings in Liquid Crystals and their use for Polarization insensitive optical switching," J. Nonlinear Opt. Phys. & Mat., 18, 1-47 (2009), incorporated herein by reference.

FIELD OF THE INVENTION

This invention relates to optical beam control and, in particular, to methods, systems, apparatus and devices for manipulating with light beams, including laser beams and beams with wide spectra and divergence angles, by translating them in the lateral direction and varying their propagation direction for optical switching, beam scanning, spectral modulation, optical tweezers, thermal seeker, imaging, information displays, and other photonics applications.

BACKGROUND OF THE INVENTION

The present invention relates to optical systems for controlling with propagation of light beams. Pointing and positioning systems are enabling components for most laser applications. Conventionally, this is accomplished using mirrors, scan wheels, optical wedges, and other two-axis gimbal arrangements as exemplified, for example, in the U.S. Pat. No. 7,319,566 to Prince et al. These opto-mechanical systems are complex, bulky and heavy for large area beams. For example, the prism apex angle, hence its thickness is increased to achieve larger deflection angles. The electromechanical systems for rotation, translation or oscillation of such mirrors, prisms, and other optical components require high electrical power for their operation. They are relatively slow and have limited range of angles that could be covered within given time period.

Thus, there is a need for thin, light-weight, fast, and inexpensive pointing, positioning, and switching systems for light beams, particularly, for laser beams. The state-of-the-art developments include all-electronics systems and rotating diffraction gratings. The all-electronics systems with no moving parts, as reviewed in P. F. McManamon, P. J. Bos, M. J. Escuti, J. Heikenfeld, S. Serati, H. Xie, E. A. Watson, A Review of Phased Array Steering for Narrow-Band Electrooptical Systems, Proceedings of the IEEE, Vol. 97, pages 1078-1096 (2009), require a large number of high efficiency diffraction gratings and spatial light modulators and/or electrically controlled waveplates. As a result, the overall transmission of these systems is reduced along with their radiation damage threshold, and their speed is limited by the speed of liquid crystal spatial light modulators and variable retarders.

Rotating diffraction gratings as described in J. C. Wyant, "Rotating diffraction grating laser beam scanner," Applied Optics, 14, pages 1057-1058 (1975), and in the U.S. Pat. No. 3,721,486 to Bramley, partially solves the problem of obtaining larger diffraction angle in thinner optical system, compared, for example to the system of Risley prisms. The light beam diffracted by the first grating in the path of the beam is further diffracted by the second grating. Depending on orientation of those gratings with respect to each other, the deflection angle of the beam can thus be varied between nearly 0 to double of the diffraction angle exhibited by a single grating. The problem with such systems is that phase gratings typically diffract light into multiple orders that need to be blocked along with the $0^{th}$ order beam. High efficiency Bragg type gratings have narrow spectral and angular range as described in the U.S. Pat. No. 7,324,286 to Glebov et al., and can be used practically for laser beams only, expanded and collimated to minimize divergence. Blazed gratings such as proposed in the U.S. Pat. No. 6,792,028 to Cook et al., still exhibit a multitude of diffraction orders due to their discontinuous structure and do not improve considerably on the width of angular selectivity and diffraction efficiency.

The cycloidal diffractive waveplates (CDWs), essentially, anisotropic plates meeting half-wave condition but with optical axis orientation rotating in the plane of the waveplate in a cycloidal manner, as described in the review S. R. Nersisyan, N. V. Tabiryan, D. M. Steeves, B. R. Kimball, "Optical Axis Gratings in Liquid Crystals and their use for Polarization insensitive optical switching," J. Nonlinear Opt. Phys. & Mat., 18, 1-47 (2009), do not have the disadvantages of conventional phase gratings. Moreover, DWs, referred to also as optical axis gratings and polarization gratings, can provide nearly 100% diffraction efficiency in micrometer thin layers. Furthermore, due to their waveplate nature, their diffraction spectrum is broadband, and can even be made practically achromatic. Due to their thinness and high transparency, they can be used in high power laser systems.

Thus, replacing Risley prisms, wedges, mirrors and/or phase gratings with DWs, provides many advantages for manipulating with light beams and imaging. As shown in S. R. Nersisyan, N. V. Tabiryan, L. Hoke, D. M. Steeves, B. Kimball, Polarization insensitive imaging through polarization gratings, Optics Express, 17, 1817-1830 (2009), not only laser beams, but complex images can be steered over large angles without light attenuation or image deformation. The paper further showed that utilizing a pair of closely spaced CDWs, one of them with switchable diffraction, it is possible to manipulate with transmission of unpolarized beams and images through apertures. This concept suggested and demonstrated in S. R. Nersisyan, N. V. Tabiryan, L. Hoke, D. M. Steeves, B. Kimball, "Polarization insensitive imaging through polarization gratings," Optics Express, 17, 1817-1830 (2009) was subsequently cited and tested in C. Oh, J. Kim, J. F. Muth, M. Escuti, "A new beam steering concept: Riesley gratings," Proc. SPIE, vol. 7466, pp. 74660J1-J8 (2009).

BRIEF SUMMARY OF THE INVENTION

Thus, the objective of the present invention is providing an optical system for translating light beams over predetermined distances and deviating over predetermined angles using a set of CDWs, the system generally being capable of controlling light beams of arbitrary polarization, wide wavelength spectrum and divergence angles, including images.

The second objective of the present invention is providing means for controlling the optical properties of said set of CDWs mechanically, by varying the relative distance and angular positions between the CDWs, as well as by using other stimuli such as electromagnetic fields and temperature that vary the diffraction efficiency of at least one CDW in the set.

A further objective of the present invention is providing an optical system wherein the light translated or deflected by the set of CDWs is further controlled with the aid of apertures, filters, and other optical elements.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not limitation.

This invention incorporates publication S. R. Nersisyan, N. V. Tabiryan, D. M. Steeves, B. R. Kimball, "Optical Axis Gratings in Liquid Crystals and their use for Polarization insensitive optical switching," J. Nonlinear Opt. Phys. & Mat., 18, 1-47 (2009), which is incorporated by reference in its' entirety.

Figure 1A:
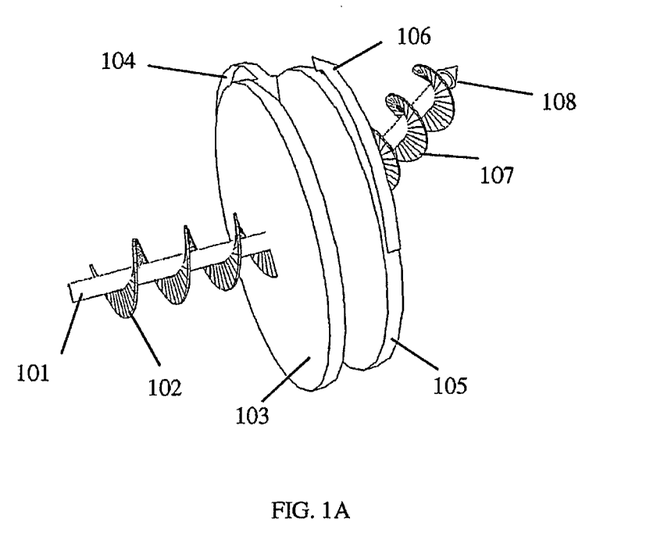
FIG. 1A schematically shows deflection of a circularly polarized light beam with a pair of diffractive waveplates.

The preferred embodiment of the present invention includes two CDWs, marked with numerals 103 and 105 in FIG. 1A, arranged parallel to each other in close proximity such as the light diffracted by the first CDW 103 is fully captured by the aperture of the second CDW 105. At the output of the set of CDWs 103 and 105, the pointing direction of the light beam 108 circularly polarized as indicated by spiral 107 is, in general, different from the propagation direction of the incident light beam 101 circularly polarized as indicated by spiral 102. The deflection angle of the beam is controlled by mechanical rotation of the CDWs schematically shown by arrows 104 and 106.

Figure 1B:
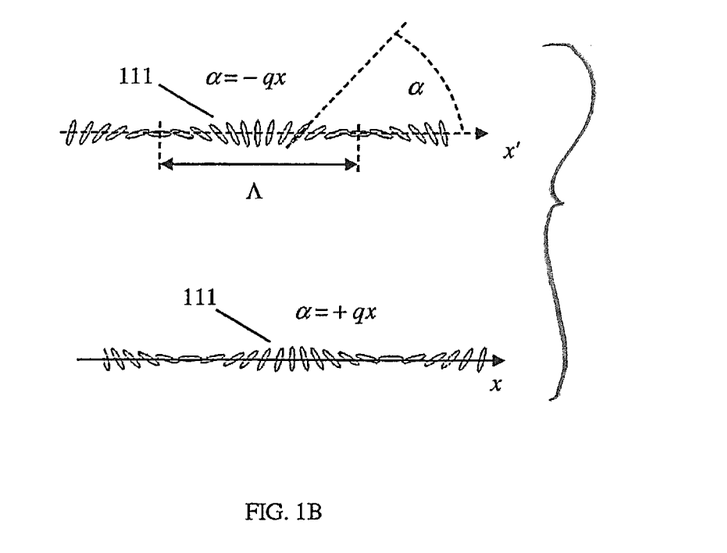
FIG. 1B describes the pattern of spatial modulation of optical axis orientation of a cycloidal diffractive waveplate along a single coordinate axis.
Figure 1C:
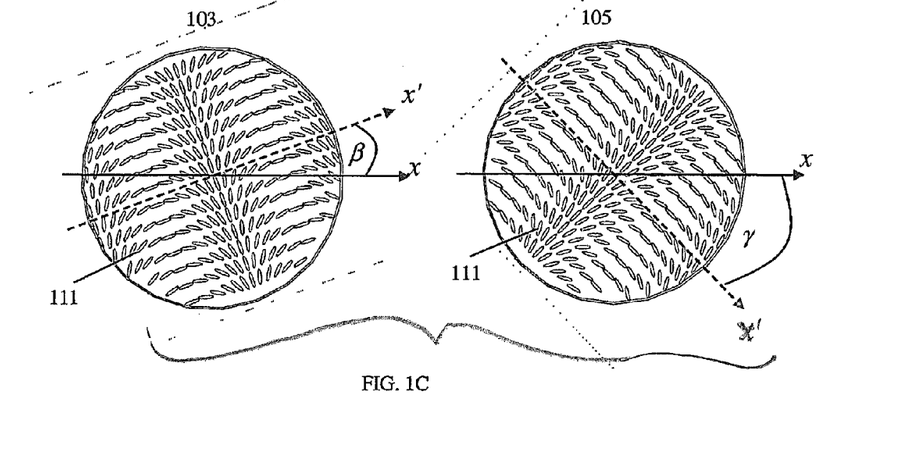
FIG. 1C schematically shows the structure of cycloidal diffractive waveplates at different rotational positions.
Figure 1D:
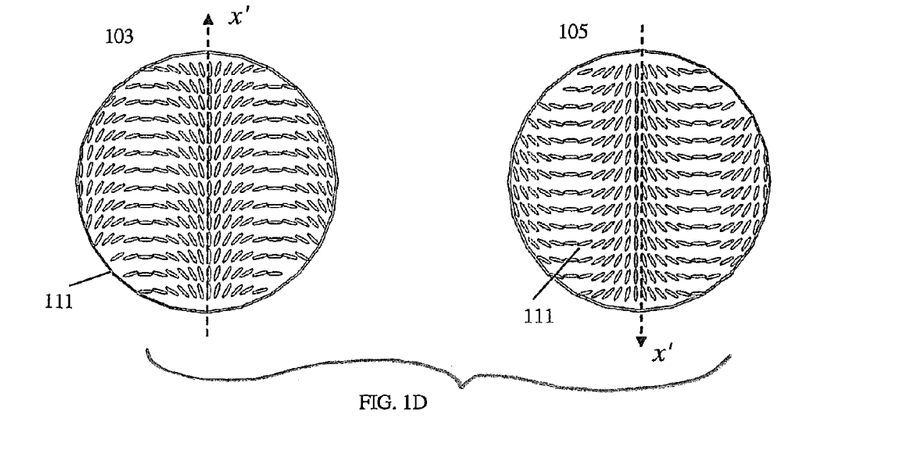
FIG. 1D schematically shows the structure of cycloidal diffractive waveplates at anti-parallel rotational positions.

It is convenient to depict the spatially modulated orientation direction of the optical axis in a CDW by elongated ellipses 111 as shown in FIG. 1B. The optical axis orientation angle $\alpha$ in a CDW varies along a single coordinate axis x': $\alpha = qx'$. The modulation period $\Lambda$ defined by the wavevector q, $\Lambda = \pi/q$, determines the magnitude of the diffraction angle of the CDWs. The orientation angles $\beta$ and $\gamma$ of the x'-axes of the CDWs with respect to a fixed x-axis in the laboratory coordinate system, FIG. 1C, determine the diffraction direction. The minimum deflection angle is 0 and it is achieved for parallel arrangement of the CDWs wherein $\alpha = qx'$ for both CDWs. This corresponds to the case where $\beta = \gamma$ in FIG. 1C. The largest deflection angle is double of the diffraction angle produced by individual CDWs, and it is achieved for their anti-parallel arrangement, schematically shown in FIG. 1D, wherein $\gamma = \beta + \pi$.

Figure 2A:
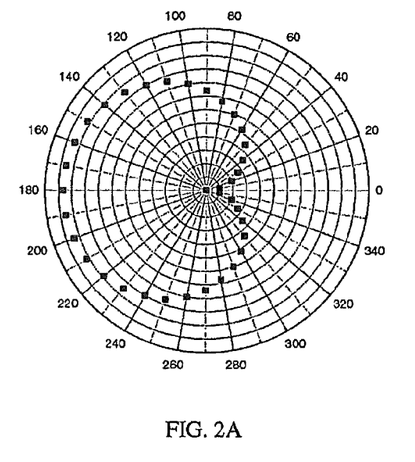
FIG. 2A shows sample dependence of the deflection angle of a light beam at the output of a pair of cycloidal diffractive waveplates as a function of the rotational angle between the waveplates.
Figure 2B:
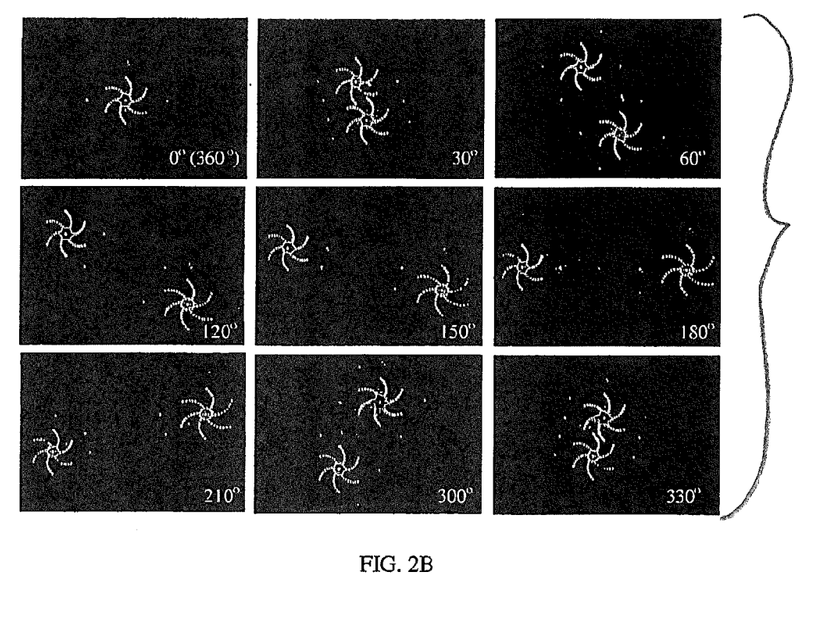
FIG. 2B demonstrates the capability of a pair of cycloidal diffractive waveplates to steer with no distortions complex images carried by an unpolarized light.

The plot of output angles measured for a sample system as a function of angular position between the CDWs in S. R. Nersisyan, N. V. Tabiryan, L. Hoke, D. M. Steeves, B. Kimball, "Polarization insensitive imaging through polarization gratings," Optics Express, 17 (3), 1817-1830 (2009) is shown in FIG. 2A for normal incidence of the beam on the first CDW. In the setup shown in FIG. 1A, the polarization of the incident beam is assumed circular, as schematically shown by the spiral 102. The output beam 108 maintains the circular polarization state 107. In case of incident unpolarized or linearly polarized beam, two beams of orthogonal circular polarization are generated at the output of the system of two CDWs, FIG. 2B. The angle between those beams changes from 0 to four times the diffraction angle when the relative rotational position between the CDWs is varied from parallel to anti-parallel. This situation, along with the photos of the two diffracted beams corresponding to some intermediate relative rotational positions of the CDWs is demonstrated in FIG. 2B for beams carrying a complex image. No image distortions occurs in this process.

In the preferred embodiment, CDWs are made of liquid crystal polymers though other optically anisotropic materials and material structures such as subwavelength gratings can be used as well. In general, the layer of CDW, typically only a few micrometer thick, is obtained as a coating on a substrate for stability and robustness. The substrate can be made of a material adequate for the particular application. As an example, a fused silica can be used when controlling UV light beams, and ZnSe, $BaF_2$ and silicon can be used for controlling laser beams of infrared wavelengths.

Figure 3:
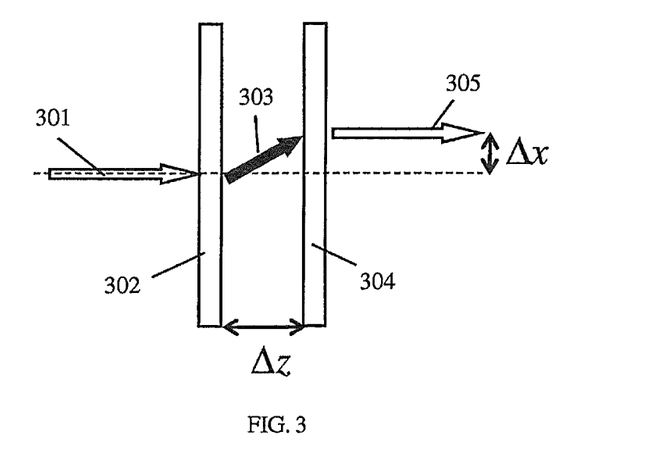
FIG. 3 schematically shows the displacement of a light beam by a pair of diffractive waveplates with parallel orientation of their optical axis modulation directions.
Figure 4A:
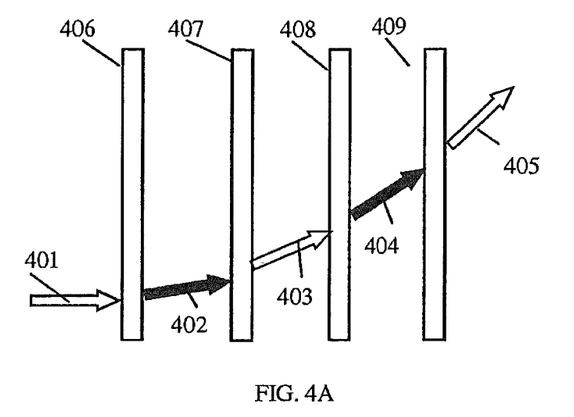
FIG. 4A schematically shows increasing of the deflection angle of a light beam by a set of four diffractive waveplates each arranged anti-parallel with respect to the previous one.
Figure 4B:
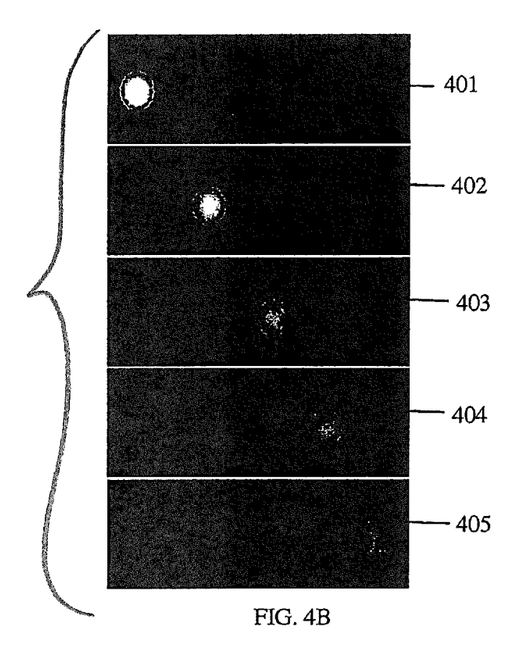
FIG. 4B demonstrates increasing deflection angle of a light beam by increasing the number of diffractive waveplates from one to four.
Figure 4C:
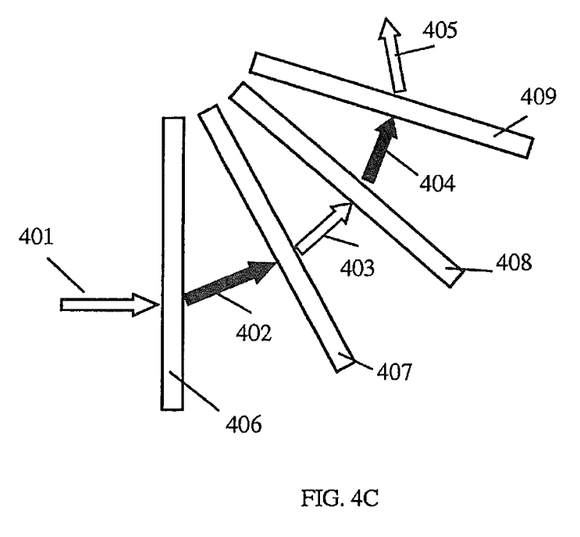
FIG. 4C shows increasing deflection angle of a light beam by a system of diffractive waveplates tilted with respect to each other.

Varying the distance Δz between two parallel arranged identical CDWs 302 and 304, FIG. 3, introduces transverse shift Δx of the beam 305 emerging from the system with respect to the position of the input beam 301 as a result of deflection of the beam 301 by the first CDW 302 into the beam 303 before it is further diffracted by the CDW 304. Said emerging beam 305 propagates parallel to the input beam 301. The beam can be translated over larger distances or steered over larger angles by adding CDWs into the set. Four CDWs, 406-409, are shown in FIG. 4A as an example. The input light 401 undergoes four deflections, 402-405. In order for each subsequent deflection to further increase the resultant deflection angle, the CDWs 407 and 409 have to be arranged anti-parallel to CDWs 406 and 408. A demonstration of light deflection by such a system of four CDWs is shown in FIG. 4B. CDWs can be tilted with respect to each other such as each of the subsequent CDWs is nearly perpendicular to the beam deflected by the previous CDW. The CDWs 407 and 409 in FIG. 4C are anti-parallel to the CDWs 406 and 408, and all four deflected beams 402-405 of the input beam 401 subsequently increase total deflection angle.

Figure 5A:
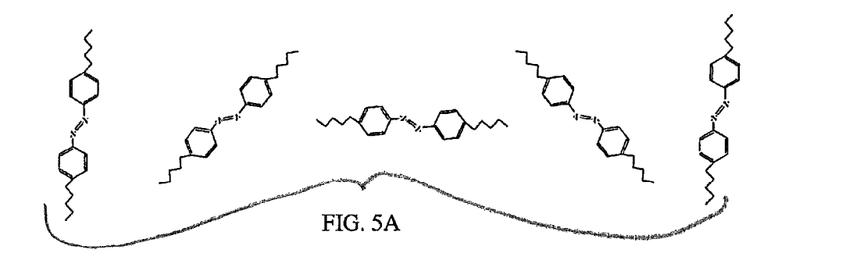
FIG. 5A schematically shows a fragment of a cycloidal orientation pattern for molecules of an azobenzene liquid crystal in trans-isomer state.
Figure 5B:
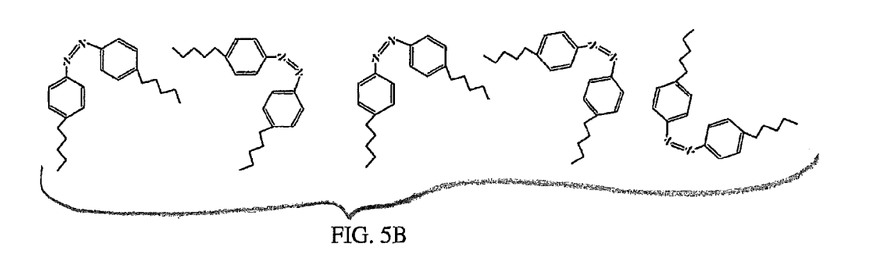
FIG. 5B schematically shows transformation of the trans isomer of azobenzene liquid crystal molecules into cis isomer state due to absorption of radiation, and respective loss of cycloidal pattern.

In another embodiment, spatial positioning of a light beam is controlled by incorporating in a set of CDWs one or more CDWs with variable diffraction efficiency and spectrum, particularly, switchable between diffractive and non-diffractive states at the influence of stimuli such as optical, thermal, electrical, or mechanical. For example, the variable CDW can be made of azobenzene liquid crystal that can be transformed into isotropic state due to trans-cis photoisomerization as shown in S. R. Nersisyan, N. V. Tabiryan, D. M. Steeves, B. R. Kimball, "Optical Axis Gratings in Liquid Crystals and their use for Polarization insensitive optical switching," J. Nonlinear Opt. Phys. & Mat., 18, 1-47 (2009). FIG. 5 demonstrates the effect of photoisomerization and temperature on the cycloidal alignment pattern of a CDW structure shown in FIG. 5A. In case of photoisomerization, FIG. 5B, the molecules of azobenzene liquid crystal isomerize into molecular structure with no mesogenic ability. Thus, the optical anisotropy of the material is reduced with accumulation of those cis-isomers and is eventually lost at sufficiently high concentration levels. For commercially available materials such as room temperature azobenzene liquid crystal 1005 (BEAM Co.), the energy required for full transformation into the isotropic state is of the order of 0.4 $J/cm^2$ for a light beam of 409 nm wavelength according to the product specifications (www.beamco.com). Azobenzene liquid crystal may also be used as a dopant to randomize a host liquid crystal orientation as a result of photoisomerization.

Figure 5C:
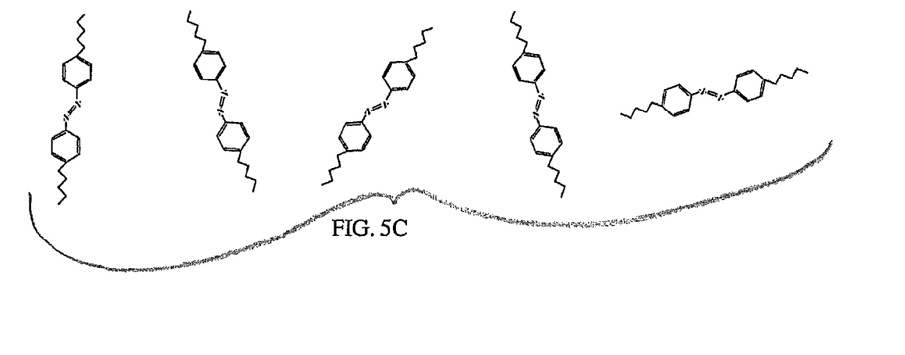
FIG. 5C schematically shows randomization of liquid crystal orientation due to temperature induced phase transition to isotropic liquid state, nd related loss of cycloidal orientation pattern.

Similar process, reducing optical anisotropy till its complete disappearance may take place also when heating the liquid crystal to the isotropic state. In this case, the molecules of the liquid crystal do not isomerize, but lose the orientational order as shown in FIG. 5C. This phase transition temperature varies for different materials. For example, it is nearly equal to 35° C. for the nematic liquid crystal 4-pentyl-4'-cyanobiphenyl widely known under the trade name 5CB.

Figure 6A:
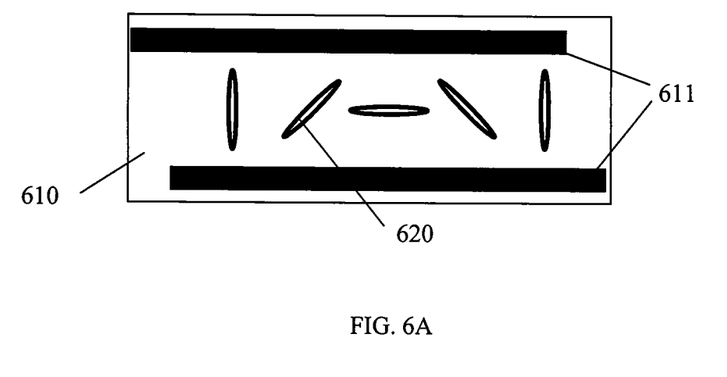
FIG. 6A schematically shows orientation of liquid crystal molecules between electrodes.
Figure 6B:
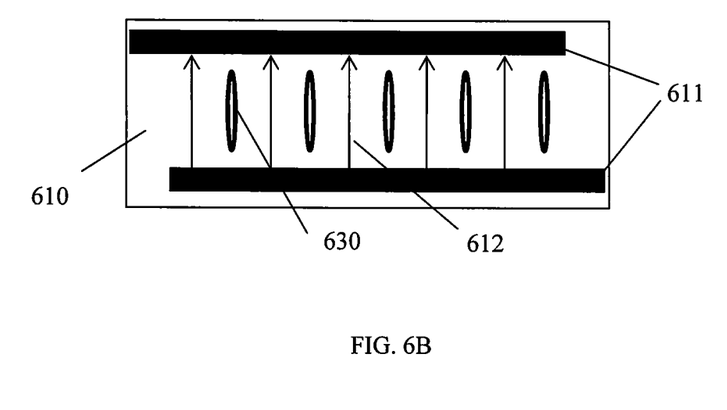
FIG. 6B schematically shows transformation of cycloidal orientation pattern into a homogeneous alignment pattern at the influence of an electric field.

Alternatively, spatially modulated orientation pattern in a CDW in a set can be transformed into homogeneous orientation state by electrical fields. In the preferred embodiment shown in FIG. 6, the electrodes 611 are deposited on one of the substrates 610 of a cell with cycloidal orientation of a liquid crystal 620. Application of an electric field 612 through the electrodes 611 aligns the liquid crystal molecules along the electric field thus transforming the diffractive structure of spatially modulated liquid crystal orientation into a homogeneous orientated non-diffractive state 630. Sinusoidal electric field at around 1 kHz frequency can be used for realignment with the strength of the field varying from nearly 1 V to 100 V depending on material properties and electrode spacing.

Figure 7A:
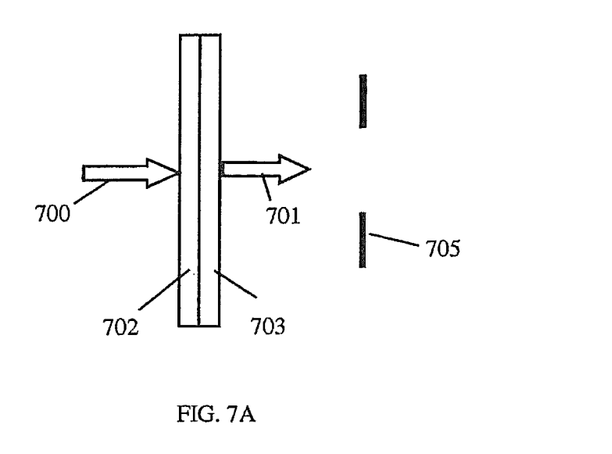
FIGS. 7A and B schematically show switching between transmittive and deflective states of a pair of cycloidal diffractive waveplates when switching one of the diffractive waveplates into an optically homogeneous non-diffractive state.

A preferred embodiment of a system for positioning a light beam with the aid of a variable CDW is shown in FIG. 7 when a CDW 703 with a fixed diffractive property is paired with a variable CDW 702 in parallel arrangement. As described above, according to S. R. Nersisyan, N. V. Tabiryan, L. Hoke, D. M. Steeves, B. Kimball, "Polarization insensitive imaging through polarization gratings," Optics Express, 17 (3), 1817-1830 (2009), the incident light beam 700 in this case, FIG. 7A, emerges from the set of CDWs as the beam 701 propagating along the propagation direction of the incident beam 700. As such, the beam 701 can propagate through the aperture 705.

Figure 7B:
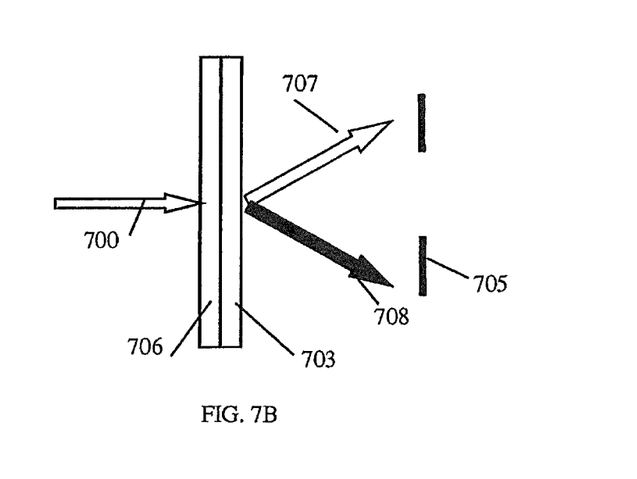

In case the CDW 702 is transformed into a non-diffractive state 706, FIG. 7B, the incident light 700 is deflected by the CDW 703 into the beams 707 and 708 for circular polarized beams of different handedness. Both diffraction orders, 707 and 708, shown in FIG. 7B are present for unpolarized or linearly polarized incident beam. The diffracted beams can be blocked from further propagation by the aperture 705.

Figure 8A:
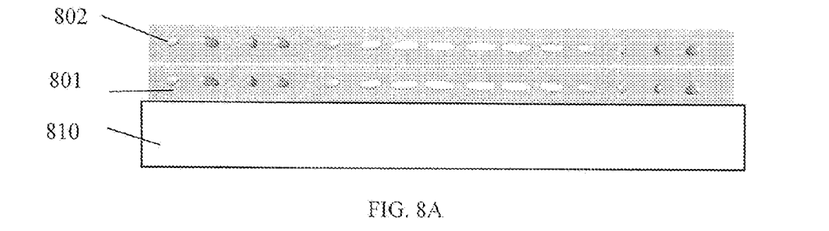
FIG. 8A schematically shows two layers of cycloidal diffractive waveplates bonded with each other on a single substrate.
Figure 8B:
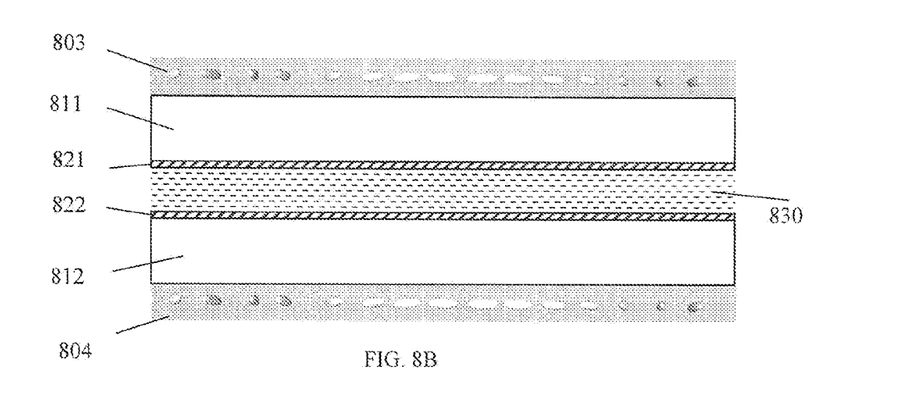
FIG. 8B schematically shows two layers of cycloidal diffractive waveplates bonded with each other with a liquid crystal cell acting as a spacer.

One advantage for controlling with pointing and positioning of light beams with the aid of variable CDWs is the opportunity for having a compact system where CDWs are physically attached to each other as schematically shown in FIG. 8A. Since each CDW layer is only a few micrometer thick, multiple layers of desired orientation and sequence can be deposited on a single support substrate. In a preferred embodiment, a variable liquid crystal polymer CDW 801 is deposited on a support substrate 810 and serves as basis for a second, not stimuli responsive CDW layer 802. In another preferred embodiment, the two CDW layers are separated with a spacer layer that may, in general, be a functional layer by itself for performing functions such as spectral filtering and phase modulation. In the preferred embodiment shown in FIG. 8B the functional spacer is a liquid crystal 830 sandwiched between glass substrates 811 and 812 and acting as an electrically or optically controlled phase modulator. FIG. 8B shows the case of electrical control with said substrates having transparent electrodes 821 and 822.

The pointing and positioning functionality of the set of CDWs of the present invention can be extended to new applications by incorporating other optical components in the system, particularly, at its output. An optical system with variable transmission is an example of such functionality obtained, for example, by arranging an aperture 705 at the output of the set of CDWs shown in FIG. 7. In the preferred embodiment, the system is in high transmission state when both CDWs, 702 and 703, are in diffractive state. The system undergoes switching onto a low transmission state, FIG. 7B, as a result of switching the structure of one of the CDWs from diffractive state 702 onto a non-diffractive state 706 since the deflected beams are blocked by the aperture 705.

The same considerations apply to the CDW system shown in FIG. 8. Note that changing diffraction spectrum of the variable CDW system shown in FIG. 7 and FIG. 8, generally, results in changing spectrum of the light transmitted though the aperture 705.

Although the present invention has been described above by way of a preferred embodiment, this embodiment can be modified at will, within the scope of the appended claims, without departing from the spirit and nature of the subject invention.

What is claimed is:

1. A system for positioning light beams comprising:
    (a) a set of two cycloidal diffractive waveplates that are bonded with each other, with or without spacers, one of said cycloidal diffractive waveplates having variable diffraction spectrum, with electrodes deposited on one substrate of a liquid crystal cell with cycloidal orientation of a liquid crystal in the liquid crystal cell, and another one of the cycloidal diffractive waveplates being not stimuli responsive to an electric field;
    (b) means for controlling the diffraction spectrum of said variable cycloidal diffractive waveplate between diffractive and non-diffractive states, by applying an electric field through the electrodes to align liquid crystal molecules along the electric field and transform spatially modulated liquid crystal orientation into a homogenous orientation; and
    (c) a light source for generating a light beam into the set of two cycloidal diffractive waveplates, wherein the system controls pointing and positioning the beam.

2. The system of claim 1 further comprising an optical setup for receiving and controlling light at an output of said cycloidal diffractive waveplates, said optical setup including one or a combination of the following: spatial filters, spectral filters, polarizers, diffraction gratings.

3. The system of claim 1, wherein the electric field includes a sinusoidal electric field of around 1 kHz frequency.

4. The system of claim 3, wherein the electric field is 1 V to 100 V.

5. The system of claim 1, wherein the one cycloidal diffractive waveplate with the variable diffraction spectrum is deposited on a single support substrate and serves as a basis for the another cycloidal diffractive waveplate.

6. The system of claim 1, wherein the cycloidal diffractive waveplates are separated from one another by a spacer layer, the spacer layer includes a liquid crystal with electrodes sandwiched between glass substrates.

7. The system of claim 1, further comprising:
    a second set of two cycloidal diffractive waveplates that are bonded with each other, with or without spacers, one of said cycloidal diffractive waveplates having variable diffraction spectrum, with electrodes deposited on one substrate of a liquid crystal cell with cycloidal orientation of a liquid crystal in the liquid crystal cell, and another one of the cycloidal diffractive waveplates being not stimuli responsive to an electric field; and
    means for controlling the diffraction spectrum of said variable cycloidal diffractive waveplate between diffractive and non-diffractive states, by applying an electric field through the electrodes to align liquid crystal molecules along the electric field and transform spatially modulated liquid crystal orientation into a homogenous orientation.

* * * * *